W. M. APPLE.
PARCEL CARRIER GUARD FOR BICYCLES.
APPLICATION FILED MAY 14, 1915.
1,189,649.
Patented July 4, 1916.
2 SHEETS—SHEET 1.
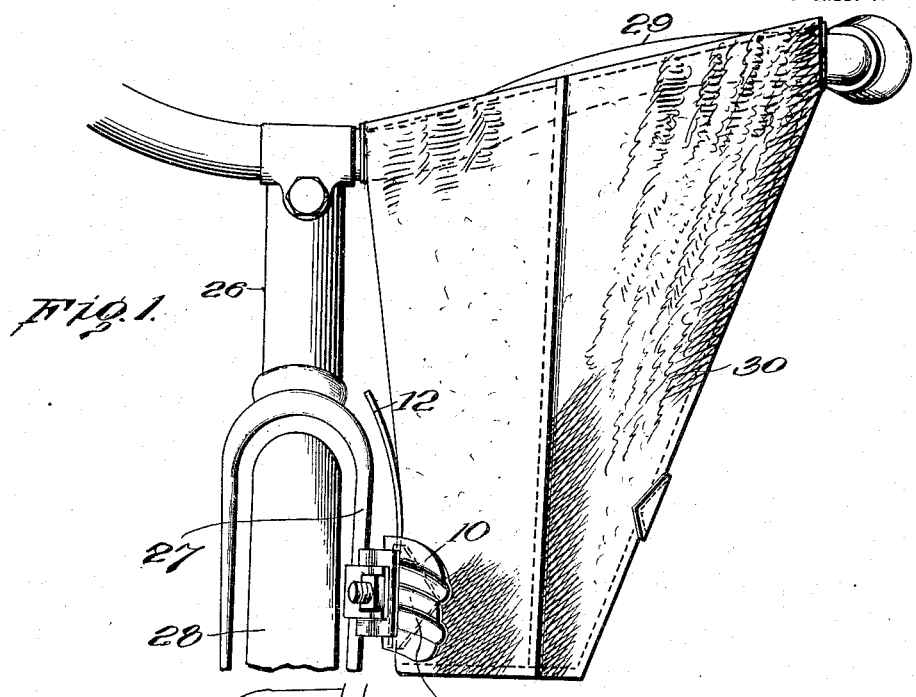
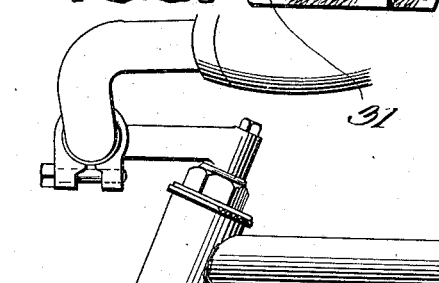
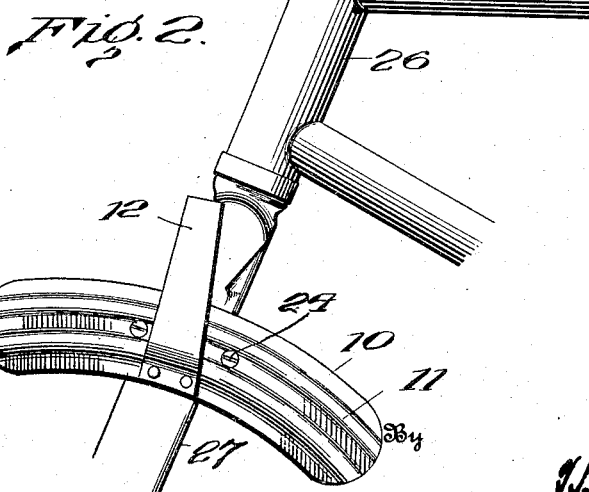
Inventor
W. M. Apple
By
Attorneys W. M. APPLE.
PARCEL CARRIER GUARD FOR BICYCLES.
APPLICATION FILED MAY 14, 1915.
1,189,649.
Patented July 4, 1916.
2 SHEETS—SHEET 2.
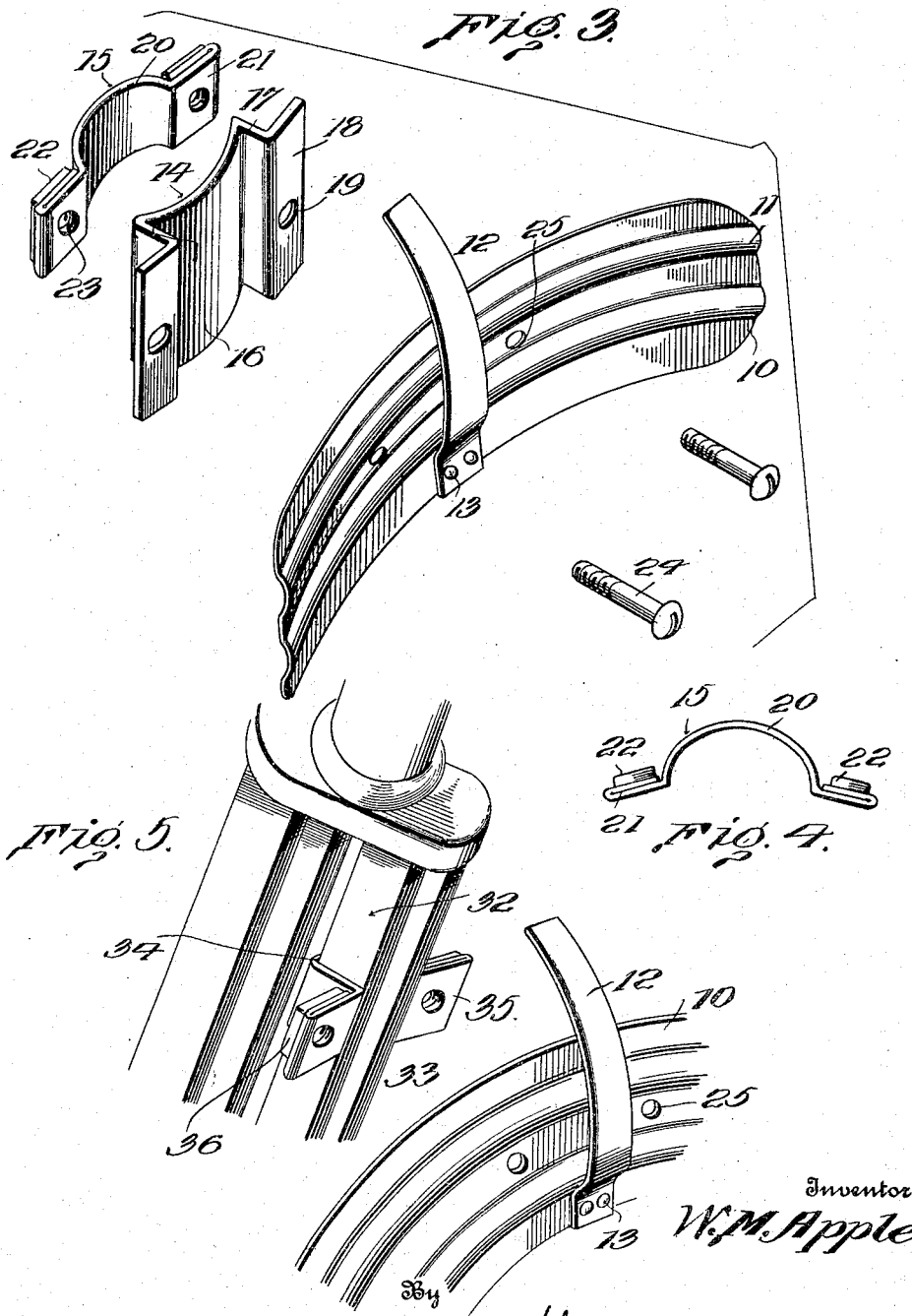
Inventor
W. M. Apple
By
Attorneys

UNITED STATES PATENT OFFICE.

WILLIAM M. APPLE, OF SAN ANTONIO, TEXAS.

PARCEL-CARRIER GUARD FOR BICYCLES.

1,189,649.     Specification of Letters Patent.     Patented July 4, 1916.

Application filed May 14, 1915. Serial No. 28,117.

*To all whom it may concern:*

Be it known that I, WILLIAM M. APPLE, a citizen of the United States, residing at San Antonio, in the county of Bexar and State of Texas, have invented certain new and useful Improvements in Parcel-Carrier Guards for Bicycles, of which the following is a specification.

This invention contemplates an improved parcel carrier guard for bicycles, being particularly designed for use in connection with my improved parcel carrier, illustrated in Patent No. 1,134,577, issued to me April 6, 1915.

The invention has as its primary object to provide a guard which may be readily connected to one front fork of any conventional type of bicycle, and adapted to prevent a receptacle or parcel carrier suspended from the handle-bars of the bicycle from interfering or coming in contact with the front wheel of the bicycle.

The invention has as a further object, in this connection, to provide a guard having coacting attaching clips formed to embrace the adjacent fork of the bicycle to seat flatly thereagainst, in such manner that the guard may be rigidly and detachably connected to the bicycle fork.

The invention has as a further object to provide a guard having an arm adapted to be operatively engaged by the receptacle for preventing lateral shifting of the lower end of the receptacle relative to the guard, and of such character that the receptacle may be readily attached to or detached therefrom.

The invention has as a still further object to arrange the arm in such manner that, under ordinary circumstances, the receptacle will not become disengaged therefrom when inserting or removing articles, into or from the said receptacle in the practical use of the device. And the invention has as a still further object to provide a guard which will be simple in construction and which will present a neat and attractive appearance in practical use.

Other and incidental objects will appear as the description proceeds and in the drawings wherein I have illustrated the preferred embodiment of the invention and wherein similar reference characters designate corresponding parts throughout the several views. Figure 1 is a fragmentary front elevation showing my improved guard operatively connected to a conventional type of bicycle with a parcel carrier in engagement therewith, the parcel carrier being supported by the handle-bars of the bicycle. Fig. 2 is a fragmentary side elevation more particularly showing the relative location of the guard upon the front forks of the bicycle. Fig. 3 is a view showing the guard detached with the parts thereof disassembled but in proper relative position, Fig. 4 is a plan view of one of the attaching clips employed, and Fig. 5 is a fragmentary perspective view showing a slight modification of the invention.

Referring now more particularly to the drawings, it will be seen that my improved guard includes a body portion 10 which is preferably formed from a single piece of suitable sheet metal and which is arcuate in general contour or is longitudinally curved as best shown in Fig. 2 of the drawings. Preferably, opposite longitudinal edges of the said body portion slope from a point medially thereof toward opposite extremities of the body portion. The body portion 10 may, of course, be of any desired width or length such as may be found desirable in use, and formed in the said body portion at transversely spaced points, are longitudinally extending reinforcing ribs 11 adapted to support the said body portion longitudinally.

Mounted upon the body portion 10 at a point substantially midway its ends and adjacent one side edge thereof, is a transversely arranged arm 12 which is offset adjacent one extremity thereof and is connected with the body portion 10 by rivets or other suitable fastening devices 13. The arm 12 is also preferably formed from a single piece of suitable resilient sheet metal and in offsetting one terminal thereof, the said arm will be supported in spaced relation to the body portion 10 and is preferably inclined toward one extremity thereof, or in other words, the forward extremity of the body portion, as best shown in Fig. 2 of the drawings.

Particular attention is now directed to the fact that the arm 12 is also arcuate in contour or, is longitudinally curved from end to end to extend laterally over the body portion 10 and considerably above the upper longitudinal edge thereof, with the concave face of the said arm presented to the body portion. The purpose of this construction will presently appear. Arranged to coact with the body portion 10 are attaching clips 14 and 15 respectively. The clip 14, as more particularly shown in Fig. 3 of the drawings, is preferably formed from a strip of suitable resilient sheet metal bent longitudinally intermediate its ends to provide a concave bearing portion 16 from the extremities of which extend legs 17 directed laterally from one side of the portion 16, the terminals of the strip being again bent to form lugs or flanges 18 disposed at substantially right angles to the legs 17. Formed in the flanges 18 are alined openings 19. The clip 15 is also preferably formed from a single strip of suitable resilient sheet metal bent longitudinally intermediate its ends to provide a concave or arcuate bearing portion 20 from the extremities of which extend radial flanges 21. Preferably, the terminals of the strip are rebent upon themselves, so that the flanges 21 are of double thickness as shown in detail in Fig. 4 of the drawings, this arrangement adding to the rigidity of the structure. Secured to the flanges 21 in any convenient manner are suitable nuts 22 provided with internally screw threaded bores alining with openings 23 formed in the said flanges.

The flanges 21 of the clip 15 are adapted to seat upon the flanges 18 of the clip 14 with the bearing portions 20 and 16 thereof respectively confronting each other, and with the flanges 18 seating against the body portion 10. Arranged to connect the several elements of the device, are screws 24 adapted to extend freely through openings 25 formed in the body portion 10, one upon each side of the arm 12, and through the openings 19 and 23 of the clips 14 and 15 respectively to detachably engage at the screw threaded extremities thereof within the internally screw threaded bores of the nuts 22. Thus as will be seen, I provide a guard which is exceedingly simple in construction and wherein the several parts thereof may be readily and easily assembled.

Attention is now more particularly directed to Figs. 1 and 2 of the drawings wherein the guard is shown applied to a conventional type of bicycle designated as a whole by the numeral 26, the bicycle being provided with front forks 27 supporting the front wheel 28 and having handle-bars 29. In use, my improved bracket is designed for attachment to one arm of the forks 27, as particularly shown in Fig. 1 of the drawings, with the body portion 10 curving away from the said arm as therein illustrated.

As is well known, the arms of the forks 27 of a conventional type of bicycle are substantially elliptical in cross-section, and it will now be observed that the bearing portions 16 and 20 of the attaching clips 14 and 15 respectively are adapted to embrace the adjacent fork arm of the bicycle to seat flatly against opposite sides thereof. In connecting the device, the attaching clips 14 and 15 are preferably first arranged in position to embrace the fork arm and the body portion 10 is then disposed flatly against the flanges 18 of the clip 14 in the manner previously described. The screws 24 are then inserted through the alined openings of the several elements of the device and are engaged with the nuts 22. Tightening of the screws will then act to bind the attaching clips 14 and 15 in engagement with the fork arm for holding the guard in position.

It will now be noted that when the device is thus mounted in operative position upon the fork 27 of the bicycle, the arm 12 extends upwardly toward the handle bars 29 and is inclined forwardly relative to the inclination of the arms of the forks 27, as more particularly shown in Fig. 2 of the drawings. It is further to be observed that since the longitudinal edges of the body portion 10 are longitudinally curved toward opposite ends of the body portion, that when the device is mounted upon the forks of a bicycle, the presence thereof will not interfere with the manipulation of the front wheel 28 in guiding the bicycle, the body portion 10 sloping away from the adjacent lower frame bar of the bicycle.

In Fig. 1 of the drawings, I have conventionally shown a parcel carrier 30 of the type set forth in my pending application previously referred to, operatively connected to the handle bars 29 and coöperating with my improved guard. The parcel carrier or receptacle 30 is in the nature of a fabric bag having openings in the wall thereof adjacent the open end of the receptacle and freely and detachably receiving the adjacent arm of the handle-bars in the manner illustrated.

The carrier will thus be supported with its lower extremity arranged to seat against the body portion 10 of the guard and mounted upon the carrier is a loop 31 adapted to freely receive the arm 12 for holding the carrier seated against the guard. It will thus be seen that in use, any lateral shifting of the carrier 30 relative to the guard will be prevented, while, at the same time, the said guard is adapted to effectually prevent the receptacle from interfering or coming in contact with the front wheel 28.

In any case where it is desired to insert a large bundle or package within the receptacle 30, one side thereof may be removed from engagement with the adjacent arm of the handle-bars by sliding the arm through the opening previously referred to in the adjacent side of the carrier when the receptacle may be more easily manipulated to receive the said package. It will now be noted that under such circumstances, the loop 31 may slide longitudinally upon the arm 12 toward the free end thereof, but since the said arm is longitudinally curved inwardly, toward the forks of the bicycle, it will be adapted, under ordinary circumstances, to maintain the loop 31 in engagement therewith. Thus, in use, packages may be easily carried about within the carrier 30 without in the slightest hampering the operation of the bicycle or interfering with the manipulation thereof.

In Fig. 5 of the drawings, I have illustrated a slight modification of the invention adapted for use in connection with bicycles having fork arms 32 each formed of coacting yieldable members 33. When used upon a bicycle having fork arms of this type, the attaching clip 14 is eliminated and an attaching clip 34 is substituted in place of the clip 15, of the preferred form of the invention. The clip 34 is preferably formed from a strip of suitable resilient sheet metal bent intermediate its ends to define a substantially U-shaped portion having its arms extending at approximately right angles to the bight portion thereof with the said arms inclined transversely toward one side of the said body portion to receive the members 33 and seat flatly against the outer side faces thereof. At its extremities, the strip is bent to form flanges 35 similar to the flanges 21 of the clip 15 and is provided with nuts 36 disposed to detachably receive the screws 24. Otherwise, the construction of this modification is identical with that of the preferred form of the invention and a detail description thereof, will not, therefore, be given. However, it will be seen that this modified structure provides a convenient means whereby my improved bracket may be readily attached to or detached from the fork arms of a bicycle of the type indicated.

Having thus described my invention, what I claim and desire to secure by Letters Patent is:—

1. A device of the character described including a longitudinally curved body portion, a longitudinally curved retaining arm supported thereby and arranged in spaced relation to the body portion with the concave face of the arm presented toward the body portion, and means for supporting the body portion upon one side of the forks of a bicycle with the body portion curving away from the said forks and adapted to receive a parcel carrier engaged with said arm.

2. A device of the character described including a body portion, a retaining arm carried thereby, an attaching clip provided with flanges adapted to seat against the body portion and formed with a bearing portion, a second clip formed with a bearing portion adapted to mate with the bearing portion of said first mentioned clip and provided with flanges adapted to coact with the flanges thereof, the said bearing portions being adapted to embrace an object, and means for connecting the body portion and the said clips together for supporting the body portion in position, the said means being arranged to extend through said flanges.

3. The combination with a bicycle having a fork, of a parcel carrier guard carried by one arm of the fork to extend transversely upon each side thereof and adapted to engage a parcel carrier supported by one arm of the handle-bars of the bicycle, and a retaining arm confronting the guard and adapted for engagement with the carrier to prevent lateral shifting thereof relative to the guard.

4. A device of the character described including a body portion, a retaining arm connected to the lower margin thereof with the arm projecting across the body portion, and mating attaching clips for connecting the body portion with one arm of the forks of a bicycle with the body portion extending transversely of the said forks upon each side thereof to receive a parcel carrier engaged with said arm.

5. A device of the character described including a body portion, a retaining arm carried thereby and extending transversely across the body portion, and means for connecting the body portion at a point intermediate its ends with one arm of the front forks of a bicycle with the body portion extending from front to rear of the front wheel of the bicycle and adapted to partially embrace one side of a parcel carrier connected with said arm.

In testimony whereof I affix my signature in presence of two witnesses.

WILLIAM M. APPLE. [L. S.]

Witnesses:
 G. CRANDALL,
 G. W. APPLE.

Copies of this patent may be obtained for five cents each, by addressing the "Commissioner of Patents, Washington, D. C."